(12) United States Patent
Shrivastava et al.

(10) Patent No.: US 11,702,336 B2
(45) Date of Patent: Jul. 18, 2023

(54) PROCESS AND PLANT FOR PRODUCING PURE HYDROGEN

(71) Applicant: L'Air Liquide, Société Anonyme pour l'Etude et l'Exploitation des Procédés Georges Claude, Paris (FR)

(72) Inventors: Swatantra Kumar Shrivastava, Lich (DE); Mirko Huebel, Frankfurt am Main (DE); Mrityunjoy Samaddar, Frankfurt am Main (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/102,593

(22) Filed: Nov. 24, 2020

(65) Prior Publication Data
US 2021/0155478 A1 May 27, 2021

(30) Foreign Application Priority Data
Nov. 26, 2019 (EP) .................................... 19020665

(51) Int. Cl.
*C01B 3/54* (2006.01)
*C10G 11/14* (2006.01)
*C10G 11/20* (2006.01)

(52) U.S. Cl.
CPC ............... *C01B 3/54* (2013.01); *C10G 11/14* (2013.01); *C10G 11/20* (2013.01); *C01B 2203/0233* (2013.01); *C10G 2300/807* (2013.01)

(58) Field of Classification Search
CPC ........ B01D 53/00; B01D 53/02; B01D 53/04; B01D 53/047; B01D 53/22; B01D 53/229;
(Continued)

(56) References Cited

U.S. PATENT DOCUMENTS 4,402,712 A    9/1983  Benkmann
6,589,303 B1 * 7/2003  Lokhandwala ........... C01B 3/56
                                                      423/655
(Continued)

FOREIGN PATENT DOCUMENTS

DE       33 35 087      4/1985
WO    WO 2017 157531   9/2017

OTHER PUBLICATIONS

International Search Report for corresponding EP 19020665, dated May 6, 2020.
(Continued)

*Primary Examiner* — Natasha E Young
(74) *Attorney, Agent, or Firm* — Elwood L. Haynes

(57) ABSTRACT

The invention relates to a process and a plant for producing pure hydrogen from an input gas containing hydrogen and hydrocarbons, in particular from a hydrogen-containing refinery off-gas, by steam reforming in a steam reforming stage and multi-stage hydrogen enrichment. According to the invention the input gas containing hydrogen and hydrocarbons is separated in a first hydrogen enrichment stage into a hydrogen-enriched substream and a hydrogen-depleted substream, wherein at least a portion of the hydrogen-enriched substream is supplied to a second hydrogen enrichment stage or introduced into the pure hydrogen product stream and at least a portion of the hydrogen-depleted
(Continued)

substream is supplied to the steam reforming stage as a reforming feed stream or as part thereof and/or to the burners as a fuel gas stream.

3 Claims, 4 Drawing Sheets

(58) Field of Classification Search
CPC ............ B01D 2256/00; B01D 2256/16; B01D 2257/00; B01D 2257/70; B01D 2257/702; B01D 2257/7022; C01B 3/00; C01B 3/02; C01B 3/32; C01B 3/34; C01B 3/38; C01B 3/384; C01B 3/50; C01B 3/501; C01B 3/52; C01B 3/54; C01B 3/56; C01B 2203/00; C01B 2203/02; C01B 2203/0205; C01B 2203/0227; C01B 2203/0233; C01B 2203/0283; C01B 2203/04; C01B 2203/0405; C01B 2203/042; C01B 2203/043; C01B 2203/12; C01B 2203/1205; C01B 2203/1211; C01B 2203/1235; C01B 2203/1258; C01B 2203/1264; C01B 2203/127; C01B 2203/14; C01B 2203/142; C10G 11/00; C10G 11/14; C10G 11/20; C10G 2300/00; C10G 2300/80; C10G 2300/805; C10G 2300/807

See application file for complete search history.

(56) References Cited

U.S. PATENT DOCUMENTS

2012/0304688 A1   12/2012   Dragomir et al.
2017/0081185 A1   3/2017    Jin et al.

OTHER PUBLICATIONS

Ullmann's Encyclopedia of Industrial Chemistry, B. Elvers, S. Hawkins, M. Ravenscroft, J.F. Rounsaville, G. Schulz, eds., $5^{th}$ (1996) and $6^{th}$ (2000) editions, 1-2, 77-82, 161-162, 270-271, 399-407.

Gasification, C. Higman and M. van der Burgt, eds., Ch. 8.2.3, Adsorption systems, Gulf Professional Publishing, Burlington, MA (2003), 340-343.

* cited by examiner

PROCESS AND PLANT FOR PRODUCING PURE HYDROGEN

CROSS REFERENCE TO RELATED APPLICATION

This application claims the benefit of priority under 35 U.S.C. § 119(a) and (b) to European patent application No. EP 19020665.6, filed Nov. 26, 2019, the entire contents of which are incorporated herein by reference.

FIELD OF THE INVENTION

The invention relates to a process for producing pure hydrogen from an input gas containing hydrogen and hydrocarbons, in particular from a hydrogen-containing refinery off-gas, by steam reforming and multi-stage hydrogen enrichment. The invention further relates to a plant for performing such a process.

BACKGROUND OF THE INVENTION

Hydrocarbons may be catalytically reacted with steam to afford synthesis gas, i.e. mixtures of hydrogen ($H_2$) and carbon monoxide (CO). Steam reforming is the most commonly employed method of producing synthesis gas which may then be converted into further important commodity chemicals such as methanol or ammonia. This may employ hydrocarbon-containing input gases such as in particular natural gas. Since natural gas contains methane as the primary constituent this is also known as steam methane reforming (SMR). However, it is also possible to employ further hydrocarbon-containing material streams, for example naphtha or liquefied petroleum gas (LPG), as input materials for steam reforming. It is further possible and often advantageous to use a mixed stream of the recited and/or further hydrocarbon-containing material streams as input materials for steam reforming.

Steam reforming of hydrocarbons is highly endothermic. It is therefore performed in a reformer furnace in which numerous catalyst-containing reformer tubes in which the steam reforming reaction takes place are arranged in parallel. The reformer tubes are usually fired with burners mounted on the top or bottom or on the side walls in the interior of the reformer furnace and directly heat the interspace between the reformer tubes.

After pre-heating by heat exchangers or fired heaters the hydrocarbon-steam mixture enters the reformer tubes after end-heating and is therein converted into carbon monoxide and hydrogen over the reforming catalyst. The composition of the product gas is determined by the reaction equilibrium; the product gas thus comprises not only carbon monoxide and hydrogen but also carbon dioxide, unconverted methane and water vapour.

For energy optimization and/or for input materials comprising higher hydrocarbons a so-called pre-reformer for pre-cracking the input material may be employed downstream of the pre-heater. The pre-cracked input material is then heated to the desired entry temperature into the main reformer, for example the steam reforming, in a further heater. Conventional pre-reforming may be defined as a steam reforming process at limited temperatures (markedly below 700° C.). It results in a gaseous intermediate whose primary constituents are methane and steam. The intermediate contains only small proportions of higher hydrocarbons, if any. This intermediate is normally subjected to further treatment in a steamer reformer described as the main reformer.

Workup of the raw synthesis gas obtained during steam reforming, which contains not only hydrogen but also carbon oxides and unconverted hydrocarbons, for example methane, is carried out in multiple stages and according to the desired target product. One or more cooling steps with or without steam generation are almost always comprised and a portion of the produced steam is often delivered to external consumers as export steam. Condensates generated during cooling are separated off and for example recycled into the steam reforming process as process steam. The heat content of the raw synthesis gas to be cooled and that of the flue gas produced by the burners may be utilized for preheating of other process media.

When the highest possible hydrogen yield is required the raw synthesis gas is subjected to a CO conversion (CO shift) in which carbon monoxide is subjected to catalytic reaction with added steam to afford hydrogen and carbon dioxide. This is followed by steps to remove the carbon dioxide, for example by gas scrubbing with amine-containing scrubbing media, and to separate other undesired gas constituents, for example methane, by cryogenic gas fractionation in a so-called coldbox.

To produce pure hydrogen this is typically followed by a final step of treatment of the crude hydrogen stream in a plant for pressure swing adsorption (PSA). Its optimal operating pressure is between 15 and 30 bar, this then allowing hydrogen yields between 80% and 92% to be achieved. At higher operating pressures the hydrogen yield recedes. The temperature of the PSA feed gas is typically below 40° C. and any condensate formed is separated beforehand.

The pressure swing adsorption uses molecular sieves as adsorbents in a series of containers operated in a staggered cyclic mode which switches between an adsorption phase and different phases of regeneration. Regeneration of the laden adsorbent is carried out by stepwise depressurization and through the use of the gas from this operation to purge other adsorbers in the regeneration cycle at a different pressure level. Depending on the number of absorbers in a line the hydrogen recovery may be up to 90% and up to 10%. It is possible to achieve a very high purity with about 50 ppm of argon and less than 10 ppm of other impurities.

While the use of methane-containing natural gas as input material or so-called feed for steam reforming dominates, other hydrocarbons, for example naphtha, liquefied petroleum gas (LPG) or refinery gases, are also employed depending on local availability. International patent application WO 2017/157531 A1 discloses a process for producing a mixed feed stream for a steam reforming plant, wherein a refinery off-gas is used as the starting basis to which a natural gas stream is admixed. This refinery gas contains around 21 mol % of hydrogen. Refinery off-gases typically employed for this purpose are for example FCC off-gas or coker off-gas.

Using hydrogen-containing input gas as the input material for steam reforming has the disadvantage that the hydrogen proportion present is conventionally passed through the entire steam reforming plant, i.e. through feed pretreatment, preheating, reforming, synthesis gas cooling and optionally further conditioning stages, before the hydrogen proportion passes into the hydrogen purification plant which usually operates by pressure swing adsorption. This is associated with hydrogen losses and elevated energy usage.

SUMMARY OF THE INVENTION

The present invention accordingly has for its object to specify a process and a plant for producing pure hydrogen from an input gas containing hydrogen and hydrocarbons which avoids the described disadvantages of the prior art.

This problem is solved by a process having the features of claim 1 and by a plant having the features of claim 11. Further embodiments of the invention are apparent from the respective subsidiary claims.

In the context of the present invention a division or separation of a material stream is to be understood as meaning production of at least two sub streams from the original material stream, wherein separation is associated with an intentional alteration of the composition of matter of the obtained substreams with respect to the original material stream, for example through application of a thermal separation process to the original material stream. By contrast, division of the original material stream is generally not associated with a change in the composition of matter of the obtained substreams.

The reaction and process conditions to be employed for performing the steam reforming and the hydrodesulfurization are known to those skilled in the art from the prior art, for example the documents cited at the beginning. These are the physicochemical conditions under which a measurable, preferably industrially relevant, conversion of hydrocarbons to synthesis gas products or of sulfur-containing hydrocarbons to sulfur-free hydrocarbons is achieved. Necessary adjustments of these conditions to the respective operational requirements will be made on the basis of routine experiments. Any specific reaction conditions disclosed may serve here as a guide, but they should not be regarded as limiting in relation to the scope of the invention.

The optional further treatment steps that may be performed with the raw synthesis gas obtained as a reforming product stream especially comprise performing one or more cooling steps with or without steam generation, heat exchange of the raw synthesis gas to be cooled and the flue gas produced by the burners to preheat process media, CO conversion (CO shift) to maximize hydrogen content, steps for removing carbon dioxide, for example by gas scrubbing with amine-containing scrubbing media, and measures for removing other undesired gas constituents, for example methane, by cryogenic gas fractionation in a so-called coldbox.

In the context of the invention higher hydrocarbons are to be understood as meaning all hydrocarbons having more than one carbon atom in the molecule.

Fluid connection between two regions of the apparatus according to the invention is to be understood as meaning any type of connection whatsoever which makes it possible for a fluid, for example a gas stream, to flow from the one to the other of the two regions, neglecting any interposed regions or components.

A means is to be understood as meaning something that enables or is helpful in the achievement of a goal. In particular, means for performing a particular process step are to be understood as including all physical articles that would be considered by a person skilled in the art in order to be able to perform this process step. For example, a person skilled in the art will consider means of introducing or discharging a material stream to include all transporting and conveying apparatuses, i.e. for example pipelines, pumps, compressors, valves, which seem necessary or sensible to said skilled person for performance of this process step on the basis of his knowledge of the art.

The indication that a material stream is to be directly supplied to a specific process stage or a specific plant part is to be understood as meaning that the material stream is introduced into this process stage or this plant part without previously having been passed through other process stages or plant parts with the exception of purely transportational operations and the means required therefor, for example pipelines, valves, pumps, compressors, reservoirs.

All pressures are reported in gauge pressure units, i.e. bar (gauge)/barg, unless otherwise stated in the particular individual context.

The invention is based on the finding that when using input gases for steam reforming which already contain an appreciable amount of hydrogen it is disadvantageous to pass the hydrogen present together with the present hydrocarbons through all stages of a conventional steam reforming process for hydrogen production according to the prior art, i.e. through feed preparation, desulfurization, heating, steam reforming, cooling and heat exchange, CO conversion, gas scrubbing for carbon dioxide removal, cryogenic gas fractionation, before the pure hydrogen is obtained only in the pressure swing adsorption stage. This procedure results in hydrogen losses and elevated energy usage which is in turn associated with elevated carbon dioxide emissions in the flue gas.

According to the invention a first aspect in the proposed process therefore comprises supplying a sub stream of the input gas stream containing hydrogen and hydrocarbons to a first hydrogen enrichment stage in which it is separated into a hydrogen-enriched substream and a hydrogen-depleted substream. The remaining proportion of the input gas stream is supplied to the steam reforming stage as a first reforming feed stream and therein converted into a reforming product stream, i.e. raw synthesis gas, which subsequently passes through the customary treatment stages elucidated above until the second hydrogen enrichment stage which is configured as a pressure swing adsorption stage. The second hydrogen enrichment stage is supplied with the reforming product stream and the hydrogen-enriched substream from the first hydrogen enrichment stage, wherein these material streams may be mixed beforehand or each supplied to the second hydrogen enrichment stage separately, and a pure hydrogen product is obtained therefrom. This thus avoids the hydrogen proportion already present in the input gas stream being subjected to the same process stages as the hydrocarbons. This increases the yield of pure hydrogen and results in energy savings.

The hydrogen-depleted substream from the first hydrogen enrichment stage may be further utilized such that it is supplied to the steam reforming stage as a second reforming feed stream and/or to the burners as a fuel gas stream. This further improves the material and energy efficiency of the process.

A second aspect of the process according to the invention is characterized in that the hydrogen-enriched substream is directly supplied to the second hydrogen enrichment stage or directly introduced into the pure hydrogen product stream. Since this introduces this material stream directly into the second hydrogen enrichment stage or alternatively in the case of a high hydrogen content directly into the pure hydrogen product stream without previously passing it through other process stages or plant parts, the hydrogen loss is minimized and the yield of pure hydrogen in the process is increased.

A third aspect of the process according to the invention is characterized in that the hydrogen-depleted substream is mixed with the reforming feed stream or exclusively forms said stream. This ensures that the steam reforming stage is supplied with a reforming feed stream of homogeneous composition, thus allowing uniform reformer operation and concentration fluctuations to be compensated or attenuated. When a sufficiently large amount of the hydrogen-depleted substream is available this may in some cases be used as the sole reforming feed stream and admixing of a further hydrocarbon-containing stream may therefore be eschewed.

A fourth aspect of the process according to the invention is characterized in that the first hydrogen enrichment stage contains a hydrogen-selective membrane, wherein the hydrogen-enriched substream is obtained as the permeate stream and the hydrogen-depleted substream is obtained as the retentate stream. It is advantageous that this allows for a compact design of the first hydrogen enrichment stage and for the hydrogen separation to be performed in selective and energy-efficient fashion.

A fifth aspect of the process according to the invention, especially configured according to aspect 4, is characterized in that the pressure of the input gas stream containing hydrogen and hydrocarbons is at least 50 barg before introduction into the first hydrogen enrichment stage. Especially when configuring the first hydrogen enrichment stage as a membrane separation plant with a hydrogen-selective membrane, the high pressure drop upon penetration of the permeate through the membrane means that a sufficiently high supply pressure is advantageous since an additional compressor can thus be avoided. The input gas containing hydrogen and hydrocarbons, for example a refinery gas, is often already available at such pressures at the plant limits of the reformer plant. A throttling of the pressure to the compatible range for a pressure swing adsorption plant would then be disadvantageous and associated with energy losses.

A sixth aspect of the process according to the invention, especially configured according to aspect 4 or 5, is characterized in that the hydrogen content of the input gas stream containing hydrogen and hydrocarbons is between 40 and 70 mol %, preferably between 50 and 68 mol %. Investigations have shown that configuration of the first hydrogen enrichment stage as a membrane separation plant brings the greatest advantages within the recited ranges. At lower hydrogen contents in the input gas stream the separation of the hydrogen from the input gas by means of the first hydrogen enrichment stage brings only reduced advantages, if any. At higher hydrogen contents in the input gas stream the configuration of the first hydrogen enrichment stage as a pressure swing adsorption plant is more advantageous compared to a membrane separation plant.

A seventh aspect of the process according to the invention is characterized in that the first hydrogen enrichment stage operates according to the principle of pressure swing adsorption (PSA). This technology is established in connection with pure hydrogen production and allows high yields and product purities.

An eighth aspect of the process according to the invention, especially configured according to aspect 7, is characterized in that the hydrogen content of the input gas stream containing hydrogen and hydrocarbons is more than 70 mol %. Investigations have shown that configuration of the first hydrogen enrichment stage according to the principle of pressure swing adsorption offers the greatest advantages at high hydrogen contents in the input gas stream of more than 70 mol %.

A ninth aspect of the process according to the invention is characterized in that the steam reforming stage comprises a plurality of partial reforming stages, wherein the first partial reforming stage in the flow direction is configured as a pre-reforming. The pre-cracking, in particular of the higher hydrocarbons, to methane in the pre-reformer allows a more homogeneous course of the reaction in the main reformer and the heat energy required in the main reformer is reduced. A homogeneous course of the reaction in the main reformer is of great importance because of the much larger size relative to the pre-reformer with a multiplicity of burner-heated reformer tubes. There are accordingly advantageous interactions with the third aspect of the process according to the invention since this too contributes to a homogeneous reformer operation.

A tenth aspect of the process according to the invention is characterized in that the reforming feed stream is supplied to a hydrodesulfurization step (HDS), wherein the reforming feed stream is mixed with a hydrogenating agent and under hydrodesulfurization conditions is at least partially freed of sulfur, wherein at least a portion of the hydrogen-enriched sub stream is used as the hydrogenating agent. The advantage here is that in this way the hydrogen used as the hydrogenating agent is already available for the hydrodesulfurization before the steam reforming plant and subsequent process stages for pure hydrogen production have been fully brought online. The hydrogen-rich permeate stream obtained in a membrane separation plant may be used as the HDS hydrogenating agent for example.

In a further aspect of the invention the plant according to the invention is characterized in that the means for supplying the hydrogen-enriched substream to the second hydrogen enrichment stage or the means for introducing same into the pure hydrogen product stream are constituted such that the hydrogen-enriched substream is directly supplied to the second hydrogen enrichment stage or directly introduced into the pure hydrogen product stream. Since this introduces this material stream directly into the second hydrogen enrichment stage or alternatively in the case of a high hydrogen content directly into the pure hydrogen product stream without previously passing it through other process stages or plant parts, the hydrogen loss is minimized and the yield of pure hydrogen in the process is increased.

In a further aspect of the invention the plant according to the invention is characterized in that the plant comprises means which allow the hydrogen-depleted substream to be mixed with the reforming feed stream or exclusively form said stream. This ensures that the steam reforming stage is supplied with a reforming feed stream of homogeneous composition, thus allowing uniform reformer operation and concentration fluctuations to be compensated or attenuated. When a sufficiently large amount of the hydrogen-depleted substream is available this may in some cases be used as the sole reforming feed stream and admixing of a further hydrocarbon-containing stream may therefore be eschewed.

In a further aspect of the invention the plant according to the invention is characterized in that the first hydrogen enrichment stage contains a hydrogen-selective membrane, wherein the substream enriched in hydrogen is obtained as the permeate stream and the substream depleted in hydrogen is obtained as retentate stream, or in that the first first hydrogen enrichment stage operates according to the principle of pressure swing adsorption (PSA). The advantage of configuring the first hydrogen enrichment stage as a membrane separation is that this allows a compact construction and the hydrogen separation may be performed in selective and energy-efficient fashion. On the other hand the configuration of the first hydrogen enrichment stage as a pressure swing adsorption allows the use of established technologies and high yields and product purities.

In a further aspect of the invention the plant according to the invention is characterized in that the steam reforming stage comprises a plurality of partial reforming stages, wherein the first partial reforming stage in the flow direction is configured as a pre-reforming. The pre-cracking, in particular of the higher hydrocarbons, to methane in the pre-reformer allows a more homogeneous course of the reaction in the main reformer and the heat energy required in the main reformer is reduced. A homogeneous course of the reaction in the main reformer is of great importance because of the much larger size relative to the pre-reformer with a multiplicity of burner-heated reformer tubes.

In a further aspect of the invention the plant according to the invention is characterized in that it comprises a hydrodesulfurization stage and also means which allow the reforming feed stream to be supplied to the hydrodesulfurization stage, wherein the hydrodesulfurization stage is in fluid connection with the first hydrogen enrichment stage in such a way that at least a portion of the hydrogen-enriched permeate stream is employable as the hydrogenating agent in the hydrodesulfurization stage. The advantage here is that in this way the hydrogen used as the hydrogenating agent is already available for the hydrodesulfurization before the steam reforming plant and subsequent process stages for pure hydrogen production have been fully brought online. The hydrogen-rich permeate stream obtained in a membrane separation plant may be used as the HDS hydrogenating agent for example.

BRIEF DESCRIPTION OF THE DRAWINGS

Further features, advantages and possible applications of the invention are also apparent from the following description of working and numerical examples and from the drawings. All the features described and/or depicted, on their own or in any combination, form the subject-matter of the invention, irrespective of their composition in the claims or their dependency references.

In the figures.

DETAILED DESCRIPTION OF THE INVENTION

Figure 1:
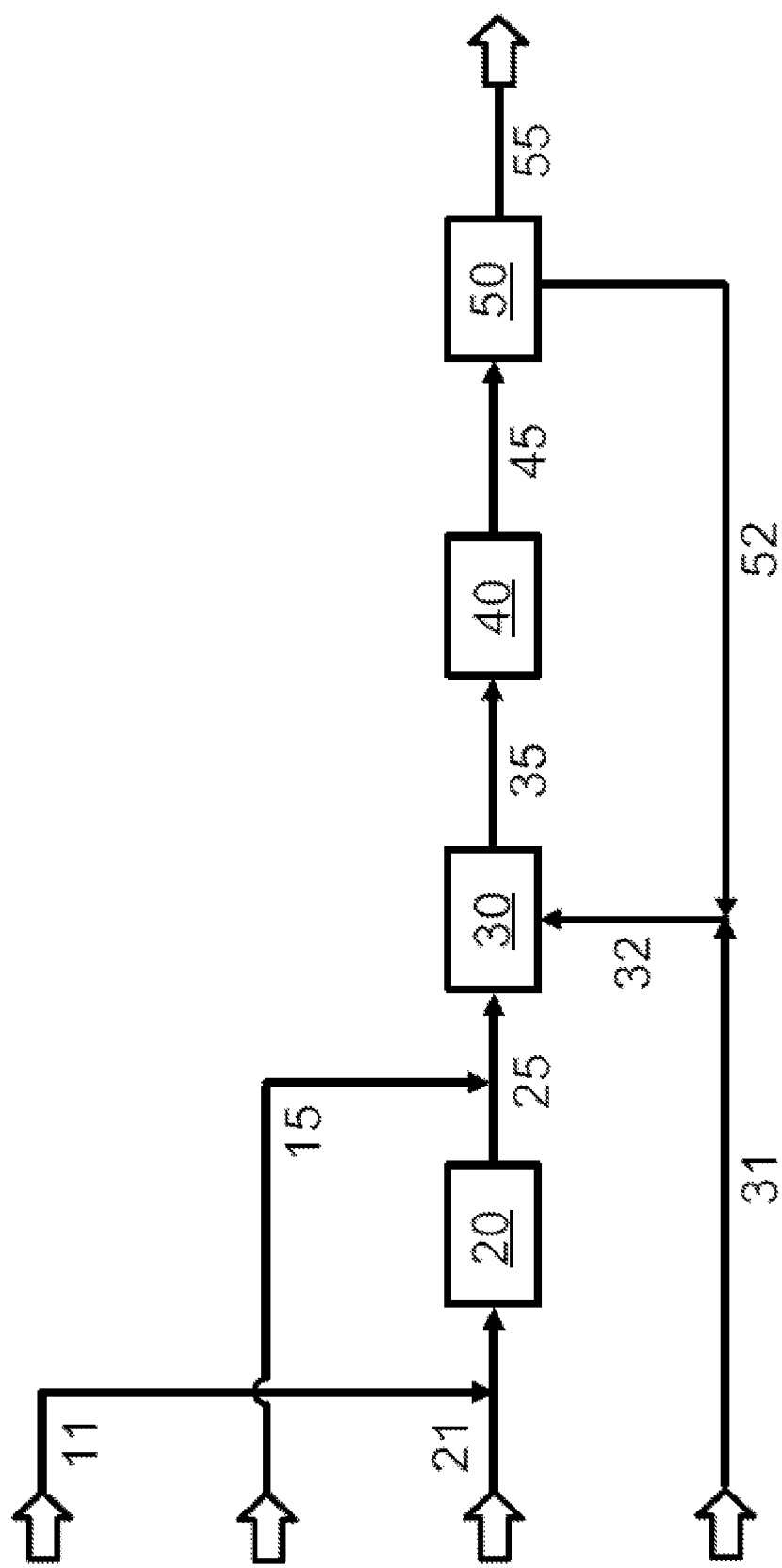
FIG. 1 is the block flow diagram of a process/a plant for producing pure hydrogen from a hydrogen-containing refinery off-gas according to the prior art.

In the block flow diagram of the process/the plant according to the prior art, shown in FIG. 1, hydrogen-containing refinery off-gas is provided via conduit 11 and introduced into conduit 21, through which natural gas and/or a further hydrocarbon-containing stream, for example naphtha or liquefied petroleum gas (LPG), is introduced into the process/the plant as the reforming feed stream. The mixed streams are subsequently supplied to the hydrodesulfurization stage 20 and therein treated under hydrodesulfurization conditions to remove the sulfur present therein and obtain a sulfur-free input gas stream. It is alternatively also possible to supply the hydrogen-containing refinery off-gas and the natural gas and/or the further hydrocarbon-containing stream to a hydrodesulfurization stage separately.

After discharging from the hydrodesulfurization stage the sulfur-free input gas stream is introduced via conduit 25 into the steam reforming stage 30 after said stream has first been admixed with steam via conduit 15 and the input gas/steam mixture has been preheated to a temperature of typically 550° C. to 650° C. via heating apparatuses (not shown). The steam reforming stage carries out the reaction of the hydrocarbons in the input gas with the added steam to afford a raw synthesis gas which contains substantially hydrogen, carbon monoxide, carbon dioxide and unconverted hydrocarbons. The reaction in the steam reforming stage is typically carried out at temperatures between 750° C. and 930° C. in cracking tubes filled with reforming catalyst which are subjected to external direct heating using a multiplicity of burners. The gaseous fuel required for burner operation consists partly of natural gas which is provided via conduit 31 and supplied to the burners via conduit 32 and a distributor system (not shown). The remainder of the fuel consists of flammable off-gas streams obtained during workup of the raw synthesis gas. FIG. 1 shows by way of example how a flammable off-gas stream is discharged from the hydrogen enrichment stage 50 which is configured as a pressure swing adsorption stage (PSA), discharged from the hydrogen enrichment stage via conduit 52 and supplied to the burners via conduit 32 together with the natural gas fuel gas.

The raw synthesis gas produced in the steam reforming stage is discharged therefrom via conduit 35 and subjected to a multistage treatment symbolized by the function block having reference numeral 40. The precise workup steps depend substantially on the type of synthesis gas product(s) desired. One or more cooling steps with or without steam generation are almost always comprised and a portion of the produced steam is often delivered to external consumers as export steam. Cooling steps without steam generation include preheating of boiler feed water and demineralized water. Condensates generated during cooling are separated off and for example recycled into the steam reforming process as process steam. The heat content of the raw synthesis gas to be cooled and that of the flue gas produced by the burners may be utilized for preheating of other process media.

When the highest possible hydrogen yield is required the raw synthesis gas is subjected to a CO conversion (CO shift) in which carbon monoxide is subjected to catalytic reaction with added steam under CO conversion conditions known to those skilled in the art to afford hydrogen and carbon dioxide. This is followed by steps to remove the carbon dioxide, for example by gas scrubbing with amine-containing scrubbing media, and to separate other undesired gas constituents, for example methane, by cryogenic gas fractionation in a so-called coldbox.

To produce pure hydrogen this is typically followed by a final processing step of treating the crude hydrogen stream in a hydrogen enrichment stage 50 which is usually configured as a plant for pressure swing adsorption. To this end the treated raw synthesis gas cooled to temperatures of 30° C. to 40° C., which already has a hydrogen content of for example 60 to 75 mol %, is discharged from the multi-stage treatment plant 40 via conduit 45 and introduced into the hydrogen enrichment stage 50. The pressure swing adsorption uses hydrogen-selective adsorbents, for example molecular sieves, in a series of containers operated in a staggered cyclic mode which switches between an adsorption phase and different phases of regeneration. Regeneration of the laden adsorbent is carried out by stepwise depressurization and through the use of the gas from this operation to purge other adsorbers in the regeneration cycle at a different pressure level. Depending on the number of absorbers in a line the hydrogen recovery may be up to 90% and up to 10%. It is possible to achieve a very high purity with about 50 ppm of argon and less than 10 ppm of other impurities. The pure hydrogen gas obtained in this way is discharged as the process product via conduit 55. A gas stream containing the impurities separated from the pure hydrogen is discharged via conduit 52. Since this gas stream is flammable on account of its content of for example carbon monoxide and hydrocarbons it is passed to the burners of the steam reforming stage via conduits 52 and 32.

Figure 2:
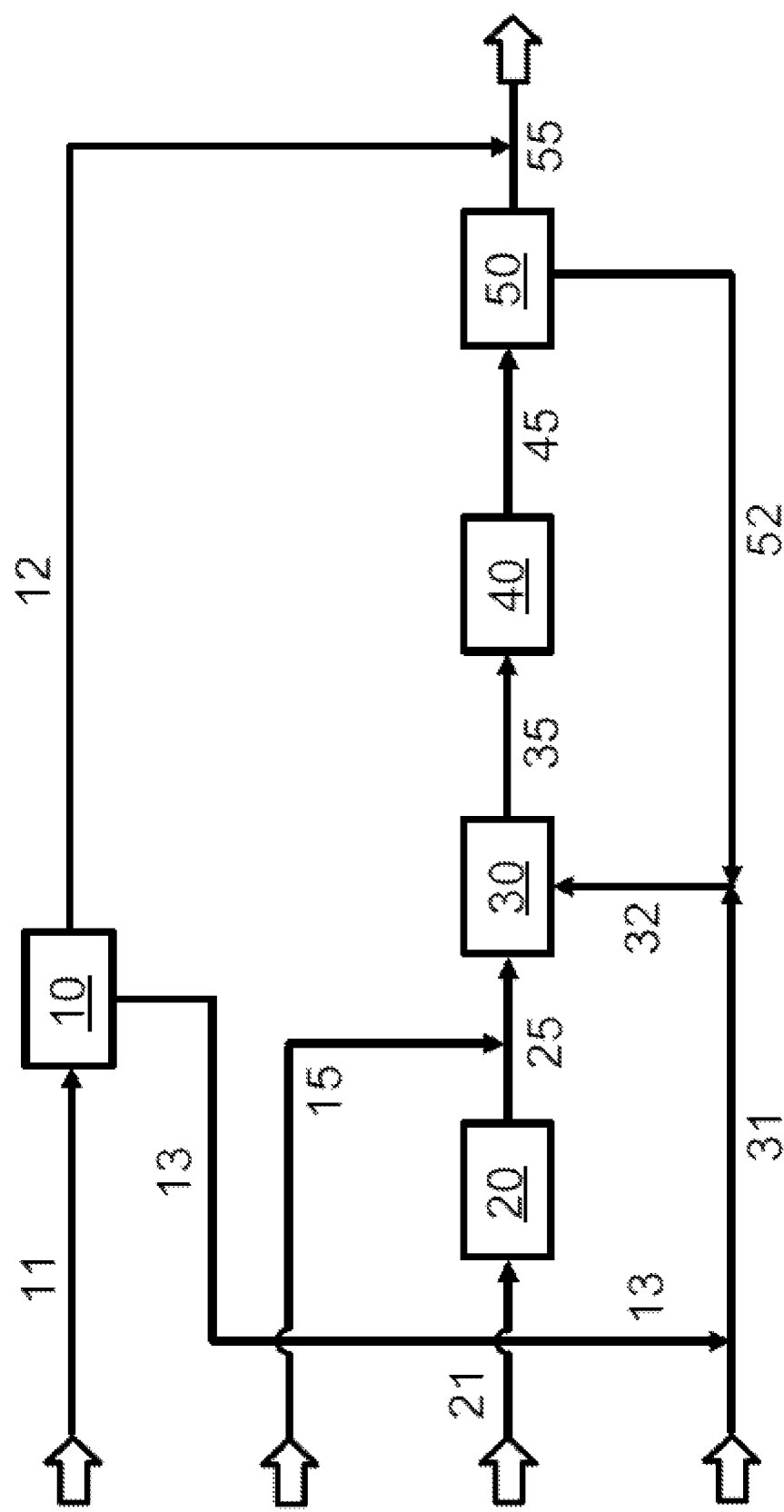
FIG. 2 is the block flow diagram of a process/a plant for producing pure hydrogen from a hydrogen-containing refinery off-gas according to a first embodiment of the invention.

FIG. 2 shows the block flow diagram of a process/a plant for producing pure hydrogen from a hydrogen-containing refinery gas according to a first embodiment of the invention. Identical reference numerals in the figures correspond to process steps or plant parts having identical properties and functions unless otherwise stated in the individual case. In contrast to the embodiment shown in FIG. 1, hydrogen-containing refinery off-gas is now provided via conduit 11 and introduced into the first hydrogen enrichment stage 10. Said stage may be configured as a membrane separation plant or as a pressure swing adsorption for example. When the hydrogen content of the refinery off-gas is sufficiently high, for example more than 60 mol %, it is advantageous to configure the first hydrogen enrichment stage as a pressure swing adsorption. The pure hydrogen produced in the first hydrogen enrichment stage is then discharged via conduit 12 and together with the pure hydrogen stream produced in the second hydrogen enrichment stage 50 discharged from the process or the plant via conduit 55. The residual gas stream likewise generated in the first hydrogen enrichment stage and containing hydrocarbons and impurities is discharged therefrom via conduit 13 and optionally after compression using a compressor (not shown) passed to the steam reforming stage as shown in FIG. 1. If the content of nitrogen and carbon dioxide in the residual gas stream is high it is preferable to pass this gas stream to the burners of the steam reforming stage via conduits 13, 31 and 32 as fuel gas, as shown in FIG. 2.

Figure 3:
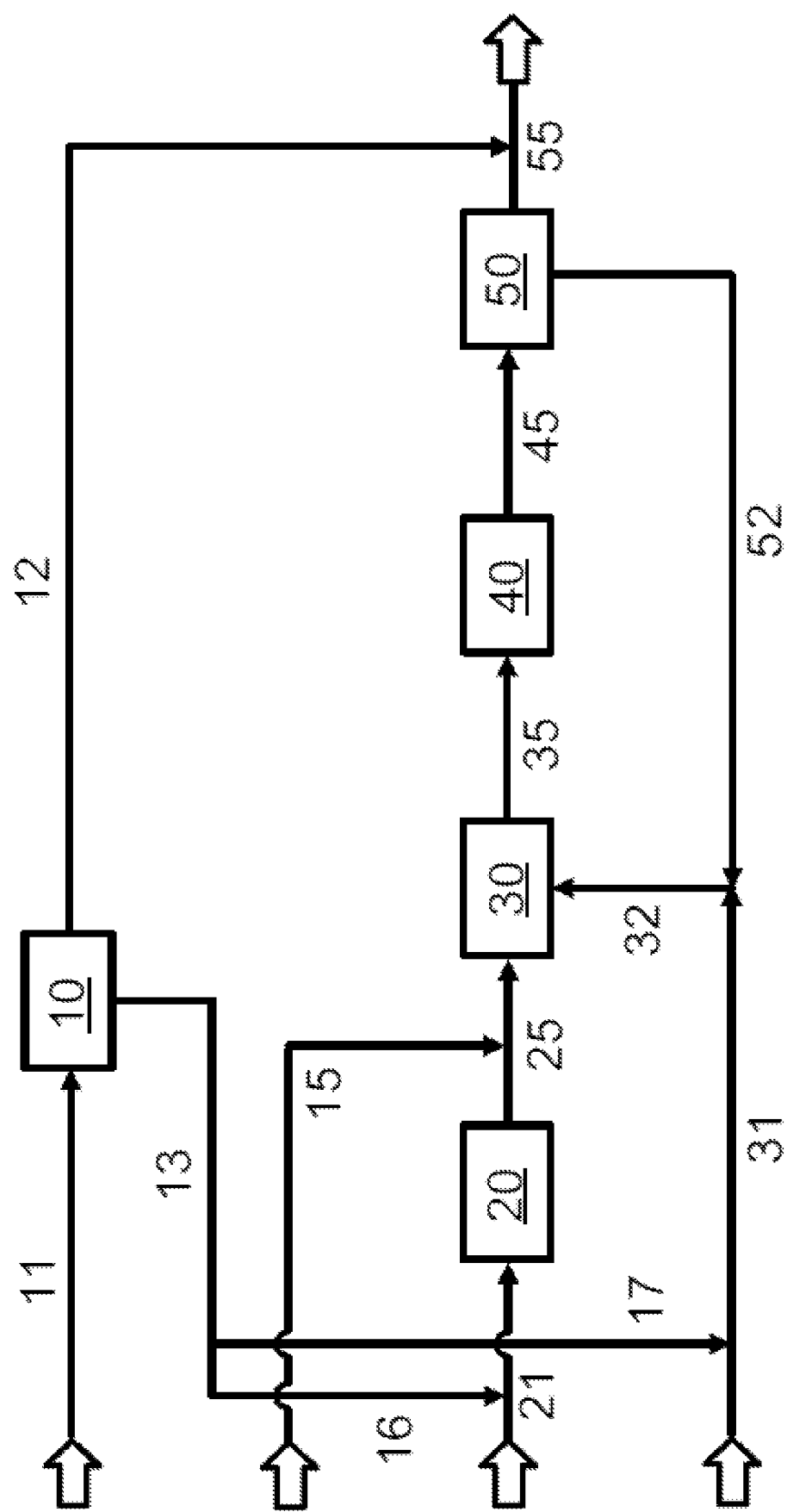
FIG. 3 is the block flow diagram of a process/a plant for producing pure hydrogen from a hydrogen-containing refinery off-gas according to a second embodiment of the invention.

FIG. 3 shows the block flow diagram of a process/a plant for producing pure hydrogen from a hydrogen-containing refinery off-gas according to a second embodiment of the invention. Identical reference numerals in the figures correspond to process steps or plant parts having identical properties and functions unless otherwise stated in the individual case. In contrast to the embodiment shown in FIG. 2 it is now assumed that the hydrogen-containing refinery off-gas is now available at a higher pressure, for example 50 barg or more, at the plant limits or due to compression by means of a compressor (not shown). Since this pressure is too high for the entry pressure to a pressure swing adsorption plant, the first hydrogen enrichment stage is preferably configured as a membrane separation plant. The pure hydrogen stream obtained as the permeate stream from the membrane separation is passed on as in FIG. 2. The residual gas stream obtained as the retentate from the membrane separation still has a sufficiently high pressure, for example 35 barg or more, and is therefore suitable as the reforming feed stream or constituent of a reforming feed stream without further compression and may therefore be supplied to the steam reforming stage via conduits 13, 16 and 21. Alternatively or simultaneously a portion or the entirety of the residual gas stream may be passed as fuel gas to the burners of the steam reforming stage via conduits 13, 17, 31 and 32 after optional pressure reduction (not shown).

Figure 4:
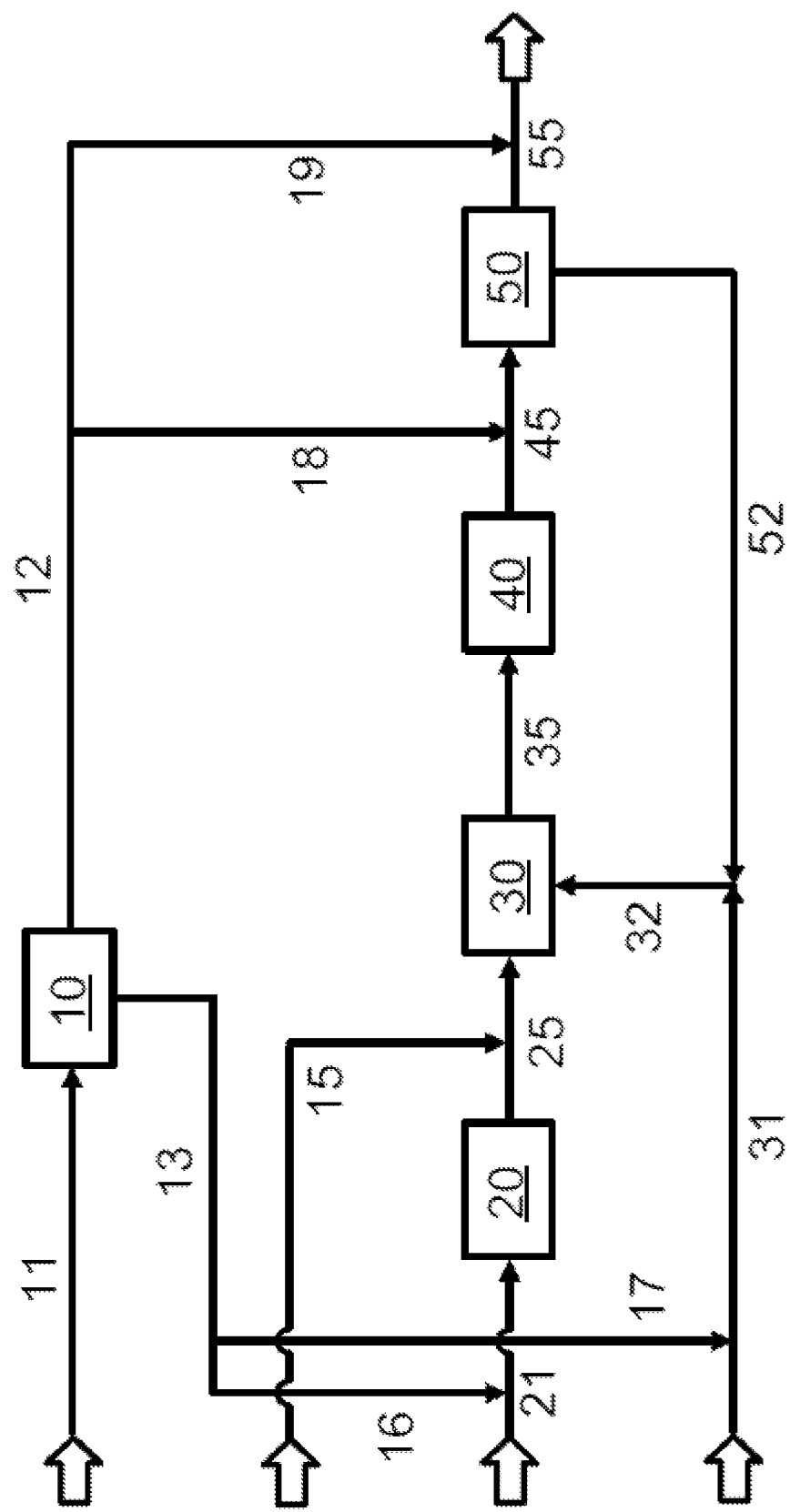
FIG. 4 is the block flow diagram of a process/a plant for producing pure hydrogen from a hydrogen-containing refinery off-gas according to a third embodiment of the invention.

FIG. 4 shows the block flow diagram of a process/a plant for producing pure hydrogen from a hydrogen-containing refinery off-gas according to a first embodiment of the invention. Identical reference numerals in the figures correspond to process steps or plant parts having identical properties and functions unless otherwise stated in the individual case. In contrast to the embodiment shown in FIG. 3 it is now assumed that the hydrogen content of the refinery off-gas is sufficiently large, for example greater than 60 mol %, but that the refinery off-gas is only available at a pressure slightly above atmospheric pressure, for example between 1 and 5 barg. It is therefore suitable for introduction into the first hydrogen enrichment stage 10 configured as a pressure swing adsorption. The pure hydrogen stream obtained in the first hydrogen enrichment stage is supplied to the second hydrogen enrichment stage via conduits 12, 18 and 45 or—depending on the purity requirements—directly to the pure hydrogen product via conduits 12, 19 and 55. The passage of the residual gas stream corresponds to that elucidated in connection with FIG. 3; however in contrast to FIG. 3 it is now necessary to bring the residual gas stream passed along conduit 16 to the entry pressure of the steam reforming stage of for example 35 barg using a compressor (not shown).

NUMERICAL EXAMPLE

The following numerical example elucidates the principle of operation and the advantages of the invention with reference to the results of the simulation calculations:

A hydrocarbon-containing input stream having a water content of about 63 mol % is available at a pressure of 4 barg. Simulation calculations were used to compare two processing scenarios for this input stream:

Scenario A (comparative example): Conventional steam reforming route according to FIG. 1 with compression of input stream to 36 barg, hydrodesulfurization, steam reforming, CO conversion, synthesis gas cooling, PSA as hydrogen enrichment stage.

Scenario B (invention): Compression of hydrogen-containing input stream to 55 barg, membrane separation plant as first hydrogen enrichment stage, hydrogen-depleted retentate stream for steam reforming route corresponding to FIG. 2, 3 or 4 with hydrodesulfurization, steam reforming, CO conversion, synthesis gas cooling, PSA as second hydrogen enrichment stage. The hydrogen-rich synthesis gas from the steam reforming route is mixed with the hydrogen-enriched permeate stream from the first hydrogen enrichment stage and the mixture is sent to a PSA as the second hydrogen enrichment stage.

As is apparent from the results reported in the following table inventive scenario B results in significant savings in respect of steam exporting and $CO_2$ emissions at identical hydrogen capacity. The relatively low level of steam exporting is often advantageous since the relatively large amount of export steam produced in the conventional steam reforming route often cannot be delivered to external consumers on a sufficient scale. The greater consumption of electricity in scenario B is attributable to the compression of the hydrogen-containing input stream to the input pressure in the membrane separation plant. If the input stream is already available at relatively high pressure electricity consumption is reduced and the energy balance of the process is further improved.

In the numerical example shown natural gas was used only as fuel gas or fuel for the burners. The input gas for steam reforming was a hydrogen-rich refinery off-gas.

|  | Scenario A (comp. ex.) | Scenario B (invention) |
|---|---|---|
| Hydrogen capacity, Nm³/h | 110000 | 110000 |
| Contribution of membrane separation to total H₂ prodn., % | 0 | 20 |
| Input stream (H₂-containing), kg/h | 26376 | 27068 |
| Fuel (natural gas), Nm³/h | 3614 | 1320 |
| Electrical power consumption, kW | 7417 | 10003 |
| Steam exporting, kg/h | 77982 | 59819 |
| CO₂ emissions, t/h | 72 | 68 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

LIST OF REFERENCE NUMERALS

10 first hydrogen enrichment stage (membrane or PSA)
11-13 conduit
15-19 conduit
20 hydrodesulfurization stage (HDS)
21, 25 conduit
30 steam reforming stage
31, 32, 35 conduit
40 multistage treatment plant
45 conduit
50 second pressure swing adsorption stage (PSA)
52, 55 conduit

The invention claimed is:

1. A process for producing pure hydrogen from an input gas containing hydrogen and hydrocarbons, the process comprising the following steps of:
   a. providing an input gas stream containing hydrogen and hydrocarbons;
   b. supplying the input gas stream containing hydrogen and hydrocarbons to a first hydrogen enrichment stage and separating a first input gas stream in the first hydrogen enrichment stage into a hydrogen-enriched substream and a hydrogen-depleted substream;
   c. providing a reforming feed stream containing hydrocarbons, which is supplied to a steam reforming stage, wherein the steam reforming stage comprises a multiplicity of catalyst-filled reformer tubes which are heated using burners;
   d. at least partially converting the reforming feed stream in the steam reforming stage under steam reforming conditions to afford a reforming product stream containing hydrogen, carbon oxides and unconverted hydrocarbons;
   e. discharging the reforming product stream from the steam reforming stage, performing further treatment steps with the reforming product stream and supplying the treated reforming product stream to a second hydrogen enrichment stage operating according to the principle of pressure swing adsorption;
   f. discharging a pure hydrogen product stream from the second hydrogen enrichment stage;
   g. supplying at least a portion of the hydrogen-enriched substream to the second hydrogen enrichment stage or introduced into the pure hydrogen product stream; and
   h. supplying at least a portion of the hydrogen-depleted substream to the steam reforming stage as the reforming feed stream or introduced into the reforming feed stream and/or supplied to the burners as a fuel gas stream,
   wherein the first hydrogen enrichment stage operates according to the principle of pressure swing adsorption (PSA).

2. A process for producing pure hydrogen from an input gas containing hydrogen and hydrocarbons, the process comprising the following steps of:
   a. providing an input gas stream containing hydrogen and hydrocarbons;
   b. supplying the input gas stream containing hydrogen and hydrocarbons to a first hydrogen enrichment stage and separating a first input gas stream in the first hydrogen enrichment stage into a hydrogen-enriched substream and a hydrogen-depleted substream;
   c. providing a reforming feed stream containing hydrocarbons, which is supplied to a steam reforming stage, wherein the steam reforming stage comprises a multiplicity of catalyst-filled reformer tubes which are heated using burners;
   d. at least partially converting the reforming feed stream in the steam reforming stage under steam reforming conditions to afford a reforming product stream containing hydrogen, carbon oxides and unconverted hydrocarbons;
   e. discharging the reforming product stream from the steam reforming stage, performing further treatment steps with the reforming product stream and supplying the treated reforming product stream to a second hydrogen enrichment stage operating according to the principle of pressure swing adsorption;
f. discharging a pure hydrogen product stream from the second hydrogen enrichment stage;
g. supplying at least a portion of the hydrogen-enriched substream to the second hydrogen enrichment stage or introduced into the pure hydrogen product stream; and
h. supplying at least a portion of the hydrogen-depleted substream to the steam reforming stage as the reforming feed stream or introduced into the reforming feed stream and/or supplied to the burners as a fuel gas stream, wherein the steam reforming stage comprises a plurality of partial reforming stages, wherein the first partial reforming stage in the flow direction is configured as a pre-reforming.

3. A process for producing pure hydrogen from an input gas containing hydrogen and hydrocarbons, the process comprising the following steps of:
a. providing an input gas stream containing hydrogen and hydrocarbons;
b. supplying the input gas stream containing hydrogen and hydrocarbons to a first hydrogen enrichment stage and separating a first input gas stream in the first hydrogen enrichment stage into a hydrogen-enriched substream and a hydrogen-depleted substream;
c. providing a reforming feed stream containing hydrocarbons, which is supplied to a steam reforming stage, wherein the steam reforming stage comprises a multiplicity of catalyst-filled reformer tubes which are heated using burners;
d. at least partially converting the reforming feed stream in the steam reforming stage under steam reforming conditions to afford a reforming product stream containing hydrogen, carbon oxides and unconverted hydrocarbons;
e. discharging the reforming product stream from the steam reforming stage, performing further treatment steps with the reforming product stream and supplying the treated reforming product stream to a second hydrogen enrichment stage operating according to the principle of pressure swing adsorption;
f. discharging a pure hydrogen product stream from the second hydrogen enrichment stage;
g. supplying at least a portion of the hydrogen-enriched substream to the second hydrogen enrichment stage or introduced into the pure hydrogen product stream; and
h. supplying at least a portion of the hydrogen-depleted substream to the steam reforming stage as the reforming feed stream or introduced into the reforming feed stream and/or supplied to the burners as a fuel gas stream, wherein the reforming feed stream is supplied to a hydrodesulfurization step (HDS), wherein the reforming feed stream is mixed with a hydrogenating agent and under hydrodesulfurization conditions is at least partially freed of sulfur, wherein at least a portion of the hydrogen-enriched substream is used as the hydrogenating agent.

\* \* \* \* \*